(12) United States Patent
Berg et al.

(10) Patent No.: US 12,737,198 B2
(45) Date of Patent: Sep. 15, 2026

(54) BPaaS COMPATIBILITY CHECK

(71) Applicant: SAP SE, Walldorf (DE)

(72) Inventors: Gregor Berg, Berlin (DE); Ralf Teusner, Walldorf (DE); Bernhard Hoeppner, Berlin (DE); Michael Perscheid, Podstam (DE); Stefan Krumnow, Walldorf (DE)

(73) Assignee: SAP SE, Walldorf (DE)

(*) Notice: Subject to any disclaimer, the term of this patent is extended or adjusted under 35 U.S.C. 154(b) by 1105 days.

(21) Appl. No.: 17/859,303

(22) Filed: Jul. 7, 2022

(65) Prior Publication Data

US 2024/0012657 A1 Jan. 11, 2024

(51) Int. Cl.

*G06F 9/448* (2018.01)
*H04L 67/53* (2022.01)
*G06F 9/54* (2006.01)

(52) U.S. Cl.

CPC ............ *G06F 9/4498* (2018.02); *H04L 67/53* (2022.05); *G06F 9/542* (2013.01)

(58) Field of Classification Search

CPC ........ G06F 9/4498; G06F 9/542; G06F 9/448; H04L 67/53; G06Q 10/06316; G06Q 10/0633; G06Q 10/067

See application file for complete search history.

(56) References Cited

U.S. PATENT DOCUMENTS

| | | | | |
|---|---|---|---|---|
| 2006/0282524 A1* | 12/2006 | Lacombe | ................ | G06F 9/542 709/224 |
| 2011/0154302 A1* | 6/2011 | Balko | .................... | G06Q 10/06 717/176 |
| 2013/0238384 A1* | 9/2013 | Caesar | ...................... | G06F 8/34 705/7.27 |
| 2018/0157384 A1* | 6/2018 | Baneva | ................... | G06F 9/542 |
| 2020/0142712 A1* | 5/2020 | Liu | ....................... | G06F 9/4498 |

OTHER PUBLICATIONS

Martens et al., "Analyzing Compatibility of BPEL Processes" (Feb. 2006), IEEE AICT-ICIW'06, pp. 1-9 [retrieved from https://ieeexplore.ieee.org/abstract/document/1602280}. (Year: 2006).*

* cited by examiner

*Primary Examiner* — Brian W Wathen
(74) *Attorney, Agent, or Firm* — Buckley, Maschoff & Talwalkar LLC

(57) ABSTRACT

The present application is directed to a system which offers a turnkey solution (BPaaS) for running an organization business process via a third-party provider. In one example, the method may include generating a first plurality of finite state automata corresponding to a plurality of event sequences of a software process of a user, obtaining a second plurality of finite state automata based on a second plurality of event sequences of a host process of a provider, establishing channels of communication between the first and second plurality of finite state automata, executing the first and second plurality of finite state automata in parallel via the established channels, and determining whether the user process is compatible with the host process of the provider based on results of the execution, and displaying a result of the determination via a user interface of a computing system associated with the user.

18 Claims, 8 Drawing Sheets

Figure 1:
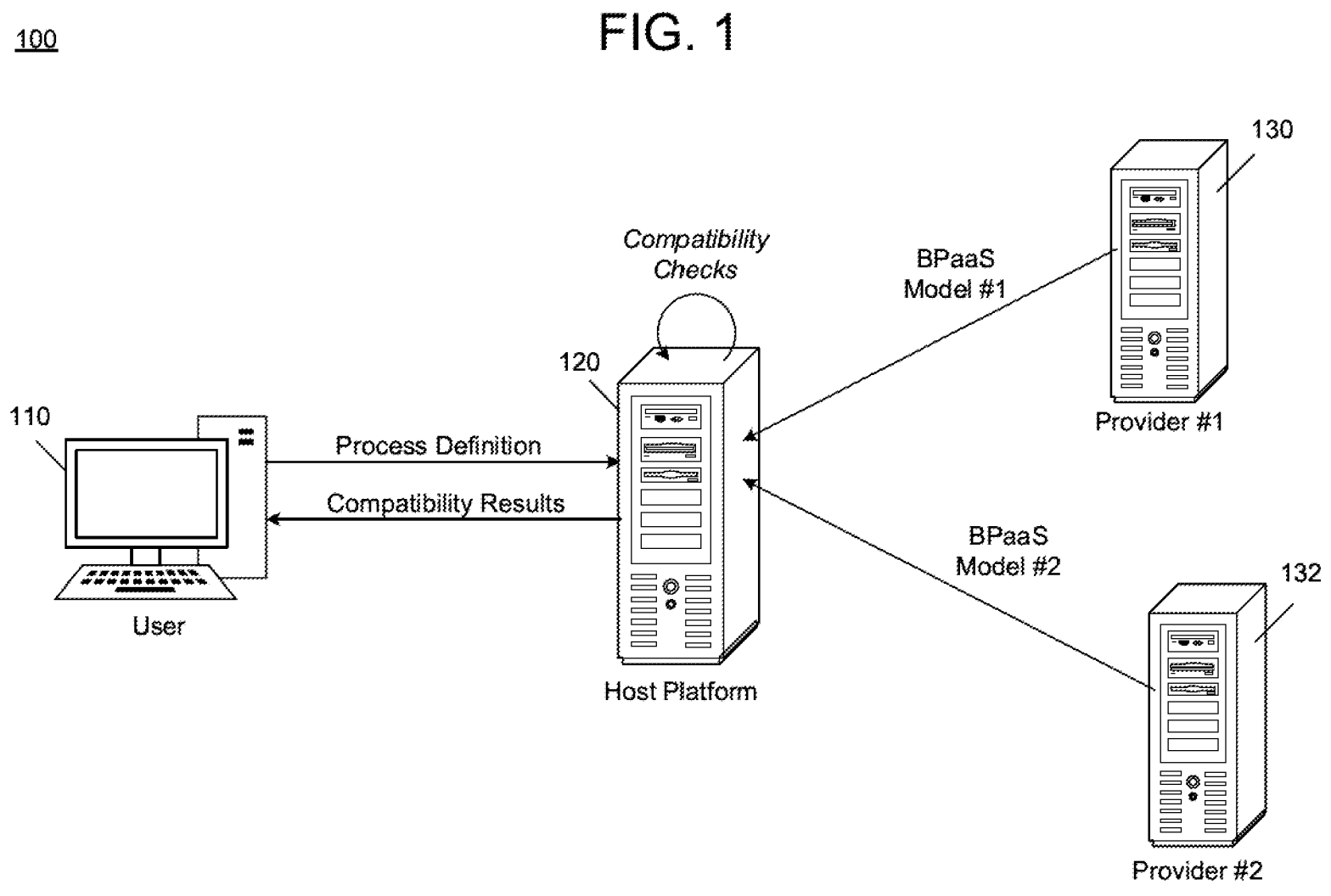

Provider #1

132

Provider #2

BPaaS Model #1

BPaaS Model #2

*Compatibility Checks*

120

Host Platform

Process Definition

Compatibility Results

110

User

Figure 2A:
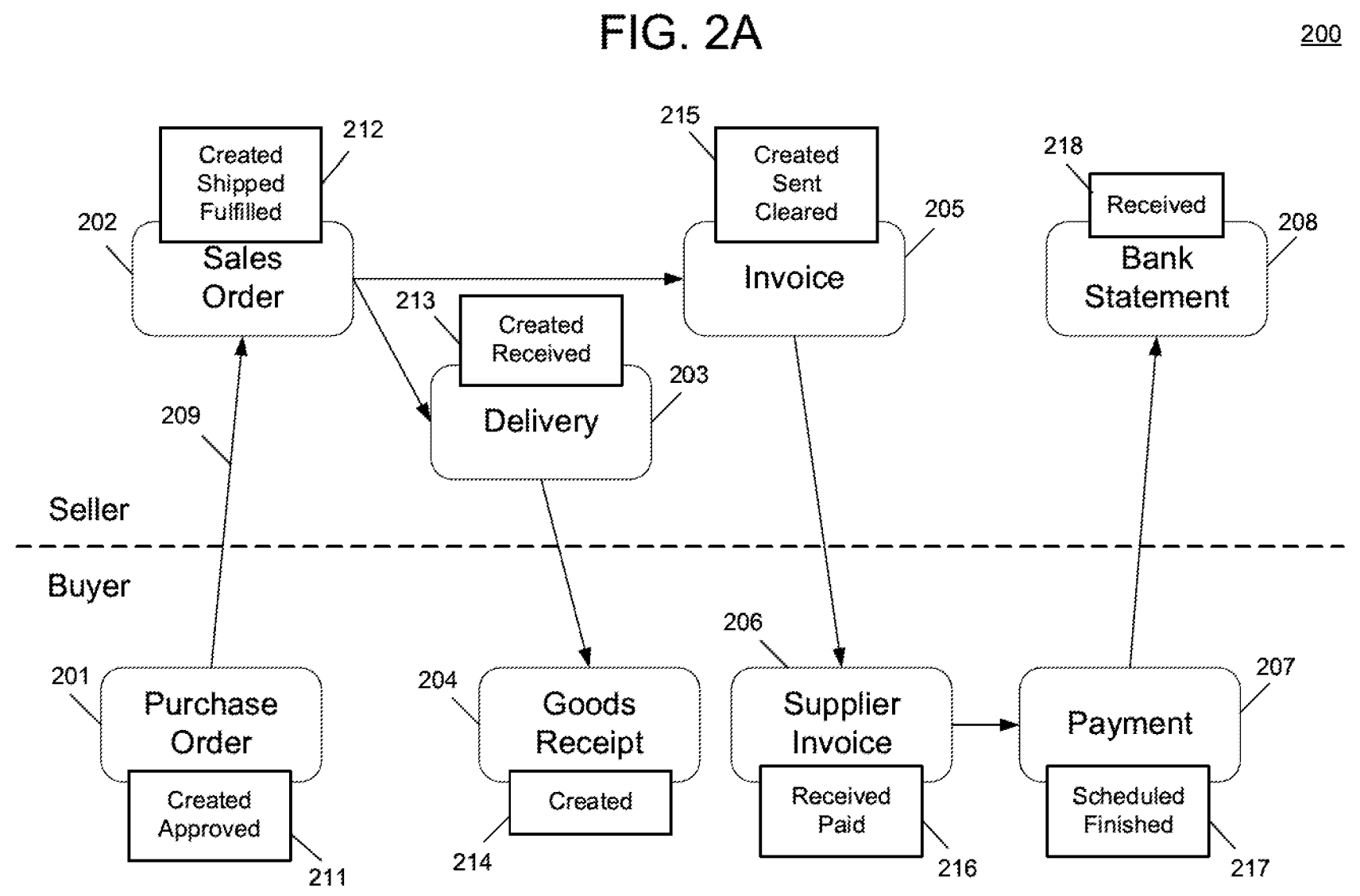

Seller

Buyer

Sales Order 202
Created Shipped Fulfilled 212

Delivery 203
Created Received 213

Invoice 205
Created Sent Cleared 215

Bank Statement 208
Received 218

Purchase Order 201
Created Approved 211

Goods Receipt 204
Created 214

Supplier Invoice 206
Received Paid 216

Payment 207
Scheduled Finished 217

209

220

Process
Mining for Events
Executing
230
224
222
Process
Instance
Required Events for P, U, C
Send Events for P, U, C
226
ERP System

240

Extracting
Events
230
244
242
BPMN
Model
Required Events for P, U, C
Send Events for P, U, C
246
ERP System 300
330
User
Wait on Order
308
Wait on SENT
Wait on Paid
ORDER
SENT
PAID
320
Provider
Wait on Order
304
306
Forward
Send Item
312
Send Invoice
Wait on Receive Item
Wait on Pay Item
Pay User
310
ORDER
SENT
INVOICE
RECEIVED
PAID
Customer
302
Order Item
Wait on Sent
Wait on Logistics
Receive Item
Wait on Invoice Sent
Pay Item

Figure 4A:
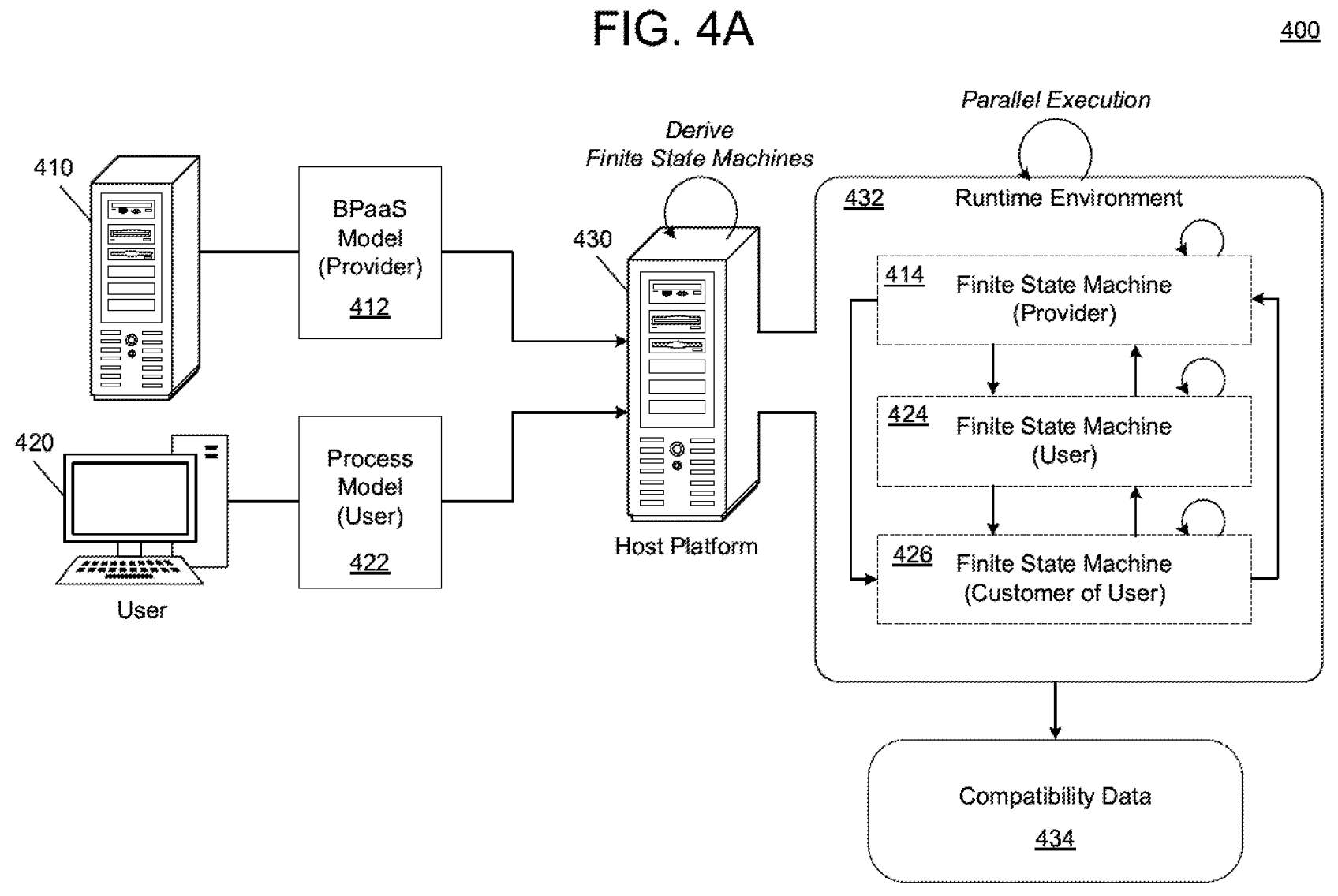

Parallel Execution

Runtime Environment

432

414 Finite State Machine (Provider)

424 Finite State Machine (User)

426 Finite State Machine (Customer of User)

Compatibility Data 434

Derive Finite State Machines

430

Host Platform

BPaaS Model (Provider) 412

Process Model (User) 422

410

420

User

500

BPaaS COMPATIBILITY CHECK

BACKGROUND

Enterprise resource planning (ERP) users (e.g., organizations, companies, etc.) often buy and manage large monolithic building blocks that they have to configure, integrate, and continuously improve to manage their ERP resources and execute their core processes. Different vendors may sell/offer different building blocks of the ERP system. In many cases, the building blocks such as the different software systems, storage systems, messaging systems, and the like, are not integrated with one another. Instead, the integration and configuration of these different systems is left up to the companies buying them. Furthermore, their users must monitor and update the systems to address routine and unexpected challenges that can often occur. Also, they have to invest into improving the processes being run on those systems.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 1 is a diagram illustrating a computing environment for checking a compatibility of a user process with respect to a business process as a service (BPaaS) offered by a provider in accordance with an example embodiment.

FIG. 2A is a diagram illustrating an example of a domain model of a BPaaS in accordance with example embodiments.

FIGS. 4A-4B are diagrams illustrating a process of converting the process model of the BPaaS and the user into finite state machines and executing them in parallel to perform a compatibility check in accordance with example embodiments.

DETAILED DESCRIPTION

Figure 2B:
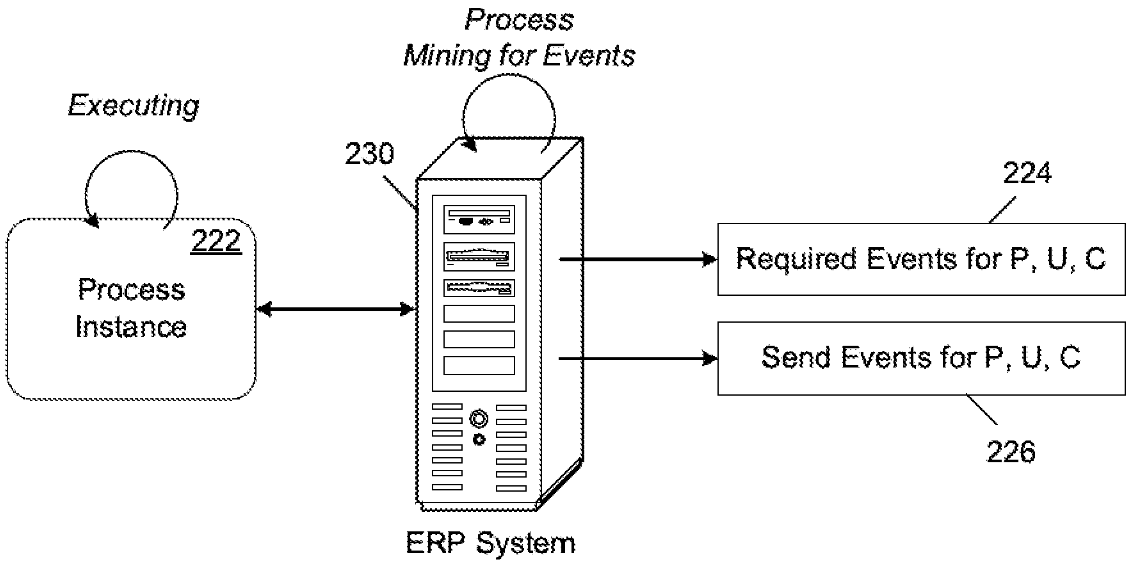
FIGS. 2B and 2C are diagrams illustrating examples of processes of generating the domain model of FIG. 2A in accordance with example embodiments.

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

In the example embodiments, a process (also referred to as a business process) may refer to a multi-party process involved in a sale of goods, or the like. The process may include various sequences of internal events and activities that are externally visible and which manifest from the internal events of the process. A global state of the process that is manifested by these internal events can be observed from the process such as receiving a purchase request, fulfilling the request, receiving payment, distributing payment to necessary parties, delivery of the item, confirmation of delivery, and many others.

In the example embodiments, a user may refer to a company or other organization that seeks to have a business process (e.g., such as an e-commerce website, etc.) managed by a BPaaS hosted by a BPaaS provider. In doing so, the user does not need to build and manage their own processes such as the hardware and software necessary for carrying out the process but can instead rely on a third-party. In this case, the "provider" can provide an end-to-end service (i.e., a turnkey solution) that manages the sales process on behalf of the user. The end-to-end process is referred to herein as a business process as a service (BPaaS) which may also include a platform-as-a-service (PaaS), an infrastructure as a service (IaaS), and the like. In a competitive environment in which multiple providers of different BPaaS solutions exist and offer multiple BPaaS processes to run the user's process, the user may be unaware of the "best" or most optimal BPaaS solution/process for their current needs, or, more basically, which of those are already functionally compatible with the user's process. The check for compatibility performed by the host platform may identify which BPaaS solutions are best for the user based on process definitions of the user's process and the BPaaS process. For example, if a BPaaS host process can perform 100% of a user's process, this may be the "most optimal" BPaaS solution. In some cases though, a most optimal BPaaS process may perform less than 100% of the user's process. In this case, the host platform can find the most optimal BPaaS process based on a level of compatibility.

For example, a host platform such as a web server, a cloud platform, a database, a distributed system, or the like, can determine the compatibility of the functions of a business process of a user with respect to a host process of a BPaaS solution offered by a provider. The host platform may verify whether the BPaaS solution can satisfy all of the process requirements of the user. If one or more requirements cannot be provided, the host system can identify these requirements and show these missing requirements to the user, for example, via a user interface. Furthermore, the host platform may identify how close the BPaaS solution is to satisfying all of the functional requirements (e.g., 80%, 90%, etc.) of the user's process. The compatibility check may be repeated for multiple different BPaaS solutions offered by multiple different providers (or the same provider). Thus, the user can identify which BPaaS solution from among multiple BPaaS solutions is most compatible with their requirements.

The compatibility check of the user's business process may be performed without having to run the business process itself. In particular, the check can be performed as part of a pre-check process using finite state machines instead of the actual business process themselves. By executing finite state machines instead of the actual processes of the user and the BPaaS, additional resources can be conserved by the host platform in comparison to executing the process. As another option, the BPaaS compatibility check can be performed during the process execution.

To perform the compatibility check, the host platform may obtain a process definition of the user's process and a process definition of the host process of the BPaaS which are to be compared for compatibility. Here, the host system may obtain the process definitions from the respective parties (e.g., the user and the BPaaS provider). As another example, the host platform may already host instances of the process of the user and/or the host process of the BPaaS offered by the provider. Here, the host platform may perform process mining or analyzing a BPMN graph of the respective processes to identify the respective processing definitions.

Figure 3:
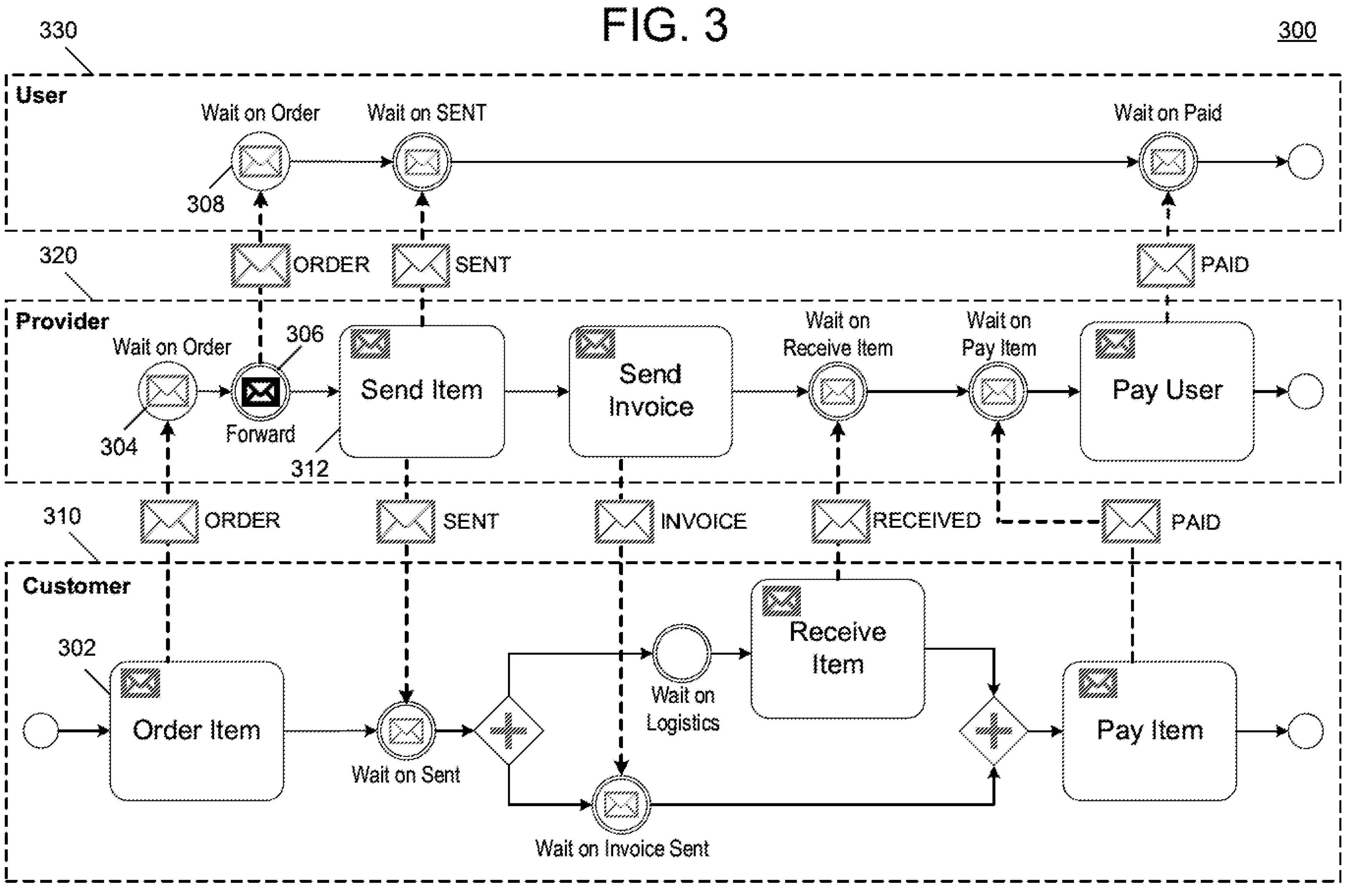
FIG. 3 is a diagram illustrating a business process model and notation (BPMN) model annotated with message flows that can be used to derive a finite state machine in accordance with example embodiments.

The events within the process definitions may correspond to documents (e.g., sales order, shipping order, delivery order, receipt, confirmation, payment, etc.), the different "states" involving the documents (e.g., created, sent, received, approved, etc.), communications being sent and received among the parties in the multi-party process, and the like. The event sequences may correspond to different roles in the process. For example, a provider may provide the BPaaS solution to a user and may be positioned between the user and the user's customers (e.g., buyers, etc.) in the formal definition of the process such as shown in the example of FIG. 3. Each of the user, the provider, and the customer may have their own domain and sequences of events in the process. Likewise, the host platform may convert a process model of the BPaaS into similar sequences of events that are performed by the process.

To perform the compatibility check, the host platform may convert the formal process definition of the user and the formal process definition of the BPaaS into respective finite state machines which are fully automated. Examples of the finite state machines include Mealy machines, π calculus (i.e., PI calculus), Business Process Execution Language (BPEL), and the like. Furthermore the host system may execute the respective finite state machines in parallel with one another allowing the finite state machines to communicate with each other to identify the compatibility of the processes. Although the user's process and the BPaaS host process are compared to each other, there may be three or more different sequences of events corresponding to three or more different entities in the process which are evaluated and modeled in the finite state machines of the user process and the BPaaS host process. For example, each of the user's process events, the BPaaS host process events, and customer events (i.e., customer of the user who is interacting with the business process of the user while it is hosted by the BPaaS) may be modeled. If any of the finite state machines "hang" or throw an error, the host can identify which events were not successfully processed (or did not result in the expected responses to the other participants) and use this when determining the overall compatibility of the two processes. In some cases, the compatibility check may check for 100% compatibility. However, this level of compatibility may be unreasonable, especially to begin with. Therefore, the compatibility check may provide a score or other percentage value indicating how closely the user's process is matched to the BPaaS process, including any missing events which may be identified and displayed with the score on the user interface. In the end, the question to answer is, whether the provided BPaaS version can cover the required process paths which are essential for the prospective user. Any process paths resulting in deadlocks (a state in which a required event has not been received) would therefore reduce the compatibility score.

In the example embodiments, the provider (P) is responsible for providing the BPaaS solution to a user. Here, the user (U) may be an organization, company, person, etc.) which has a process (e.g., selling goods online, etc.) that they wish for the provider (P) to manage for them. The BPaaS may be a turnkey solution in which the provider is able to handle most if not all of the process for the user. The process may also include customers (C) which refer to the customers of the user (U) which purchase the goods offered by the user (U) using the BPaaS provided by the provider (P). Each of the provider (P), the user (U), the customer (C), and others, may have their own sequences of events in the process definitions.

To arrive at a BPaaS world, clear interfaces for describing the expectation and the provided process alternatives may be used to enable automated compatibility checks. For example, the host platform may automatically check whether a provider's BPaaS offering (or a new version of such a process) is compatible with its users' expectation. The analysis becomes challenging because the process usually involves execution of multiple events/steps at multiple different computing systems (domains) such as across multiple ERP systems. For example, a user's invoice for the sale of goods is equal to a purchase order of a customer. To provide a BPaaS solution, it is helpful to connect both perspectives/domains to understand whether the BPaaS caters to all of the needs of the user.

By establishing a common domain model and orchestrating how the control and data flow are covered, the BPaaS provider is able to expose the BPaaS implementation of a process via the host platform and offer its execution as a service to users of the host platform. Furthermore, the host platform can automatically allow the user to check whether/to which degree the offering of the BPaaS provider is compliant to the current process executions of the user. This can be achieved by collecting and automatically encoding required event sequences as parallel automata and executing the parallel automata and performing a compliance check automatically at the host system.

In the following description, various assumptions are made for simplified discussion and ease of understanding. For example, it is assumed that the BPaaS provider (P) runs a standard enterprise software stack. Non-functional requirements, for example, max time between events, etc., are not considered. It is assumed that the complete main data records of U are exposed to the BPaaS provider P (actual implementations might acquire the data on-demand, using more intricate permission checks). Global process requirements, e.g., that provider P, user U and customer C are legally allowed to conduct the type of business that the BPaaS implements. Furthermore, in some embodiments, it may be assumed that events belonging to a process instance are sent via broadcast to all interested participants. For example, when an event is processed by the provider, the other interested parties (e.g., user U and customer C) may receive a broadcast communication indicating completion of the event, etc.

FIG. 1 is a diagram illustrating a computing environment 100 for checking a compatibility of a user process with respect to a BPaaS offered by a provider in accordance with an example embodiment. Referring to FIG. 1, a host platform 120 may perform a compatibility check for a BPaaS offered by a provider with respect a process definition of a multi-party process of a user. In FIG. 1, the host platform 120 receives a request for a compatibility check from a user device 110. For example, the host platform 120 may operate a search interface and marketplace where users can purchase/register for use with BPaaS's offered by other providers. The user device 110 may send a process definition of the user to the host platform 120. The process definition may include a file (e.g., XML, BPMN, etc.) which required sequences of events that are to be performed by the user's multi-party process and the domains/views of each of the parties involved in the process including which events/state changes affect them.

The host platform 120 may also receive process models or other process definitions of different BPaaS's offered by different providers or the same provider. The process models may be provided during an onboarding/registration process. As another example, the process models may be derived in an automated fashion as further described in the examples of FIGS. 2B-2C and provided to the host platform 120. In the example of FIG. 1, a first provider 130 hosts a first BPaaS implementation and a second provider 132 hosts a second BPaaS implementation. The host platform 120 may determine the compatibility of each BPaaS with respect to the process definition of the user. As further described in the examples of FIGS. 4A-4B, the host platform 120 may convert the process definition of the user into a finite state machine. Likewise, the host platform 120 may convert the process model of a BPaaS into another finite state machine and execute the two in parallel with one another to identify any events of the user process that cannot be handled by the BPaaS. This same process may be repeated for multiple providers and multiple BPaaS offering, such as the first provider 130 and the second provider 132.

The results of the compatibility check may be output by the host platform 120 to the user device 110. For example, the compatibility check may provide a score (e.g., 75% compatible, etc.). As another example, the compatibility check may output a Yes/No answer where "Yes" means every event is covered and "No" means one or more events are not covered by the BPaaS. As another example, the compatibility check may identify which events of the user process were not correctly handled by the BPaaS, and output identifiers of the events thereby informing the user of the customizations that may need to be made to use the BPaaS.

In the example embodiments, a BPaaS model (such as a BPMN process model) is externalized in such a way that prospective users can check their own process model against it to see if the offered BPaaS fulfills their control flow requirements (e.g., non-functional requirements and data flow may be out of scope). The collection of the required models may be performed using interviews on the user interface with input from the user, attributes of the process which are extracted from annotated BPMN models, process mining of an executing instance of the process, and the like. The process models can then be converted into finite state machines which can be run together in parallel and simultaneously thereby verifying whether the requirements included in the user process are covered in the BPaaS process, and/or which parts of the process are not covered. In the latter case, the prospective user might not use the BPaaS or the provider adapts the process to the user's requirements (and then runs the check again).

The BPaaS may scale in such a way that it does not just cover the usual 1:1 integration scenario between two companies. Instead, a whole process description is published for all prospective users to check their process against. The idea of using state machines for protocol analysis has been around for a while, also the process modeling concepts in a service-oriented world. In those cases, however, the called entity was usually restricted to a simple request-response model while the example embodiments address a whole end-to-end process by breaking it into the externally visible signals between participants as they are today, not just digitally, but also via letters, calls and logical handovers. One of the benefits of the approach is that the required models can be extracted from control-flow definitions most customers already have (i.e., their BPMN models already stored by the host platform or somewhere else, etc.) By keeping these BPMN models up-to-date, the tedious process of checking whether a new BPaaS increment (i.e., a new release of the process) is still compatible can be done automatically by the provider directly.

FIG. 2A illustrates an example of a domain model 200 of a BPaaS in accordance with example embodiments. The domain model 200 represents a domain model of a provider of the BPaaS. Potential users may also provide similar domain models to the host platform. It should also be appreciated that the domain model 200 may be learned or otherwise automatically derived by the host platform as further described in the examples of FIGS. 2B and 2C. Referring to FIG. 2A, a provider may build a domain model 200 which includes a plurality of nodes 201, 202, 203, 204, 205, 206, 207, and 208 which represent a plurality of different business document, respectively, of the BPaaS solution.

In addition, each of the nodes in FIG. 2A includes state data that shows the different "events" associated with each document. Here, the plurality of nodes 201, 202, 203, 204, 205, 206, 207, and 208 are annotated with states 211, 212, 213, 214, 215, 216, 217, and 218, respectively. Some of the documents may go through different states. For example, a purchase order may be created during a first state/event, and then approved during a subsequent state/event. In addition, the domain model 200 may separate the events/nodes into different domains such as a seller and a buyer domain. In addition, arrows 209 are used to connect the different nodes thereby creating a sequence of events that are performed. In some cases, an event may be local and not reported to other parties in the process (e.g., the creation of a purchase order, as only it's approval triggers external activities). As another example, an event may be broadcast to all parties in the process when it is performed by the entity performing it.

The domain model may include documents such as Sales Order and Invoice involved in the process and instances thereof. Here, the states those documents are in represent the overall state of the process instance. Events ($\mathcal{E}$) are observable as part of this process. The events can be based on timing (Due Date arrived), human intervention or automated processing of process instances, or the like. The process state transition are also of relevance. For example, a process may require a sequence of events in which an order arrives, a delivery leaves the warehouse, an invoice is sent, an invoice is paid, and a return has been triggered by a customer. Events are used (almost exclusively) to communicate state changes of the involved documents. Counter examples out of scope are, e.g., due notices a few days before a due date is reached. This domain model establishes a common language for describing the capabilities, requirements and interfaces of the BPaaS to the user and the customer.

FIG. 2B illustrates a process 220 of an enterprise resource planning (ERP) system 230 mining a process instance 222 of a BPaaS offered by a provider and auto-identifying the events which can then be added to a process model by the ERP system 230 such as the domain model 200. In this example, the ERP system 230 may be coupled to or otherwise in communication with the host platform 120 of the marketplace. It should be appreciated that the process mining does not need to be performed by an ERP system, and may be performed by another system or host platform if desired. Local users of the process instance 222 may create and send events and documents associated with the process. The ERP system 230 may perform a process mining operation on the process instance 222 while it executes. In some cases, the ERP system 230 may host the process instance 222. Here, the events, documents, communications (e.g., send, receive, etc.) may be stored in a log or other storage mechanism which is analyzed by the ERP system 230. In response, the ERP system 230 may determine and output required sequences of events 224 and required send events 226 associated with each of the required sequences of events 224. The ERP system 230 may then formalize these sequences of events 224 and the send events 226 into a model.

Figure 2C:
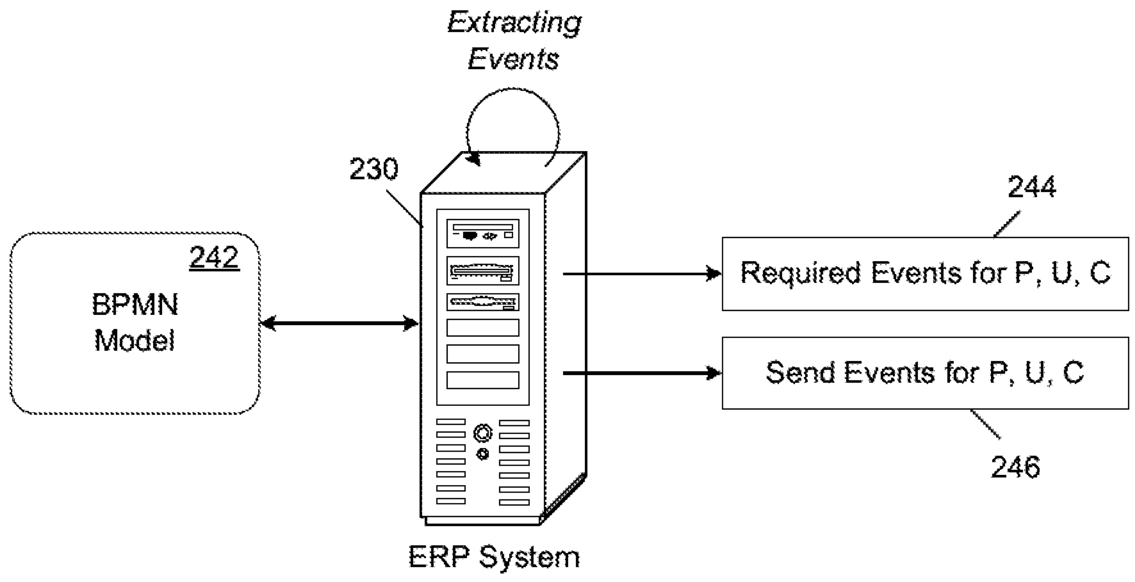

FIG. 2C illustrates a process 240 of analyzing a graphical model of a process such as a business process model and notation (BPMN) model 242 of a process such as a BPaaS offered by a provider or a process performed by a user. The BPMN model 242 may be represented in graphical form such as shown in the example of FIG. 3. In this example, the ERP system 230 may extract events, document types, states, communications, and the like, from the BPMN model 242 to identify sequences of events 244 and send events 246 associated with each of the sequences of events 244. The ERP system 230 may then formalize these sequences of events 244 and the send events 246 into a business model.

In the example embodiments, the process model may define which events are required to be received by the different parties, and which events are to be sent by the different parties. For example, an event of an invoice being created may be dependent on a purchase order being created and sent to the provider. This is just one example. Furthermore, the process model may define the events that are required for each party among the different parties, including the send events for those respective parties. The result is different sets of events including documents, statuses, communications (sent and received), and the like, which can then be converted into a finite state machine in an automated manner based on the formal representation of the events.

For example, for each process participant of the process, certain sequences of events are considered successful or not from a functional perspective. For example, a user process may require events such as an “item ordered”, “item sent”, “item paid”, and then “item delivered”, in sequence. A fully compatible BPaaS example host process may execute each of these steps in sequence (e.g., item ordered→item sent→item paid→item delivered). Meanwhile, an incompatible BPaaS example host process may include: item ordered→item sent→item delivered→item paid event, where the item-delivered event is not included. Within the formal representation, an arbitrary number of other, non-critical events may intersperse the sequence. Such event sequences $\mathcal{S}$ are specific for individual participant (e.g., $\mathcal{S}_U$ for U or user) and rely on the set of required events $\mathcal{E}^R$ of the participant.

For instance, the user U expects a successful sale to be characterized by the sequence:

1. Ordered event: customer C orders on the website of provider P,
2. Sent Delivery event: provider P is expected to send the item as delivery to customer C,
3. Payment Collected event: customer C is expected to pay for the item to provider P, and
4. Payment to U event: provider P is expected to pay the user U the amount of payment from the customer C minus a fee.

In this example, the challenge is to collect those sequences from the user U and the customer C in such a way that the provider P can ensure that the BPaaS implementation supports most if not all of their required sequences. Thus, it has to be ensured that each event which is part of such a sequence S can be sent by one of the other participants while they execute their part of the process. Any internal processing is abstracted away while the focus is observable outcomes which are communicated between the participants, i.e., events being sent between them.

In some embodiments, the sequences can be collected via interviews with the respective parties via a user interface or in person. As another example, the host platform may annotate existing BPMN models of the involved parties which cover the BPaaS in question. The annotations may be performed by a user via a user interface of the host platform. Each activity the participant executes might change the state of the process instance. If so, the corresponding event may be added to the model (thereby creating the participant's event set $\mathcal{E}^S$). Each activity (sequence) might rely on an event received from another participant, for example, by modeling this event type specifically, the host platform can arrive at the participant's event set $\mathcal{E}^R$ as a triggering condition for follow-up activities and events to send. If the host platform sees that the user U usually already has executed process instances w/his customers, user U is able to provide an approximation of sent and required events of customer C which simplifies the process (e.g., because provider P only has to interact with user U who, in the end, pays provider P for the BPaaS, interactions with customers of U would only happen if U opts for using the process provided by P)

FIG. 3 illustrates a BPMN model 300 that can be used to derive a finite state machine in accordance with example embodiments an example of event sequences 310, 320, and 330, respectively, corresponding to sequences of events that are performed by three participants (e.g., a customer, a provider, and a user, etc.) of a multi-party process, respectively, of the same process model. These sequences may be taken from one process model such as the BPaaS process model. A similar set of sequences of events (with possibly different event sequences) may be created based on the respective process model of the user. Thus, the requirements of the user can be normalized into a formal representation that can be compared and checked against a formal representation of the BPaaS. Accordingly, the host platform can check a compatibility of the user's multi-party process with respect to the BPaaS. In this example, the prospective user U of the BPaaS aims at outsourcing the Order-to-Cash process to a provider P, Basically, P would cover most, if not all, interactions with customers of U.

Referring to FIG. 3, a first event sequence 310 represents a sequence of events performed by a customer of the process. In this case, a first event 302 of the process involves the customer ordering an item such as a good or service from a website, or the like. Meanwhile, second event sequence 320 represents a sequence of events performed by a provider of the process. In this case, a second event 304 of the process involves the provider waiting for the order (i.e., the first event 302) from the customer. Once the second event 304 is received, the provider sends an event 306 to the user of the process. In this example, a third event sequence 330 represents the sequence of events send or received by the user of the provided process. Here, the user simply waits for receipt of the sending of the order by the provider (308). Some events may cause external communications among the parties. Other events may not be of interest to the other parties and may be internal.

The BPMN model 300 may include sequences of events for each of the participants involved in the BPaaS (or the user process) and interconnections (communications, emails, messages, etc.) which may be sent between the parties and which trigger changes in status of each of the document/events. For example, an event 312 involves the provider sending the item from the order to the customer via physical delivery such as via a shipper. Here, the event 312 is triggered by event 306 (i.e., the provider sending the order to the user). Other similar ordering and triggers exist throughout the BPMN model 300 which makes it an ideal model for identifying sequences of events that are required by a process and that are sent between participants of the process. The sequences of events and the communications can be extracted or otherwise identified from the BPMN model 300 to create finite state machines are further described in the examples of FIGS. 4A and 4B.

FIG. 4A illustrates a process 400 of a host platform deriving a finite state machine 414 and a finite state machine 424 corresponding to a BPaaS hosted by a provider 410 and a multi-party process implemented by a user 420, respectively. Here, the provider 410 may provide a process model 412 of the BPaaS hosted by the provider and the user 420 may provide a process model 422 of the user. As another example, the process models 412 and/or 422 may be mined from executing instances of the respective processes or extracted from BPMN models or other formal representations of the respective processes. In response, the host platform 430 may generate the finite state machine 414 such as a Mealy automata for the BPaaS offered by the provider 410 and the finite state machine 424 such as a Mealy automata from the multi-party process of the user 420. In addition, the host platform may derive a process model for the customer (i.e., a business customer of the user's business process that will be hosted by the BPaaS). For example, sequences of events of the customer (e.g., send and receive, etc.) can be derived from the process model 422 of the user and converted into a finite state machine 426. The Mealy automata may be a Mealy machine with states that change as events occur in the process. The finite state machines 414, 424, and 426 may be stored in a storage device that is accessible to the host platform where it is accessible during a BPaaS compatibility check.

In some embodiments, the providers may provide their finite state machines to the host platform in advance of a compatibility check with a prospective user (i.e., companies who would like the BPaaS to manage their business process, etc.) The host platform may store the process models and the finite state machines in a storage that is local on the host platform or otherwise accessible via a network. When a prospective user (i.e., companies who would like the BPaaS to manage their business process) is interested in requesting a compatibility check, the user may send a copy of their process (i.e., a user process) to the host platform along with a corresponding finite state machine for the user process. Alternatively, as just one example, the host platform can generate the finite state machine based on compatible inputs provided by the user, e.g., annotated BPMN diagrams in XML format, or the like. In response, the host platform may obtain a finite state machine of a BPaaS provided by a provider from storage and execute both the finite state machine of the user process and the finite state machine of the BPaaS of the provider to perform a compatibility check.

Referring again to FIG. 4A, during a BPaaS compatibility check, the host platform 430 may execute the finite state machines 414 and 424 within a runtime environment 432 of the host platform 430, and determine whether the process of the user 420 is compatible with the BPaaS offered by the provider 410. During execution, the host platform 430 may establish communication paths between the finite state machine 414 and the finite state machine 424 enabling the two to communicate and run together in parallel. If one of the state machines gets hung up or otherwise creates an error or other message, the host platform 430 may detect such an occurrence and determine that the event is not compatible. This may be enough to determine that the BPaaS is not compatible for the user' process or it may not. One way of efficiently analyzing whether these state machines are functional successfully communicating is to perform a state-space analysis of their possible interactions vie the defined events $\mathcal{E}$.

The host platform 430 may output compatibility data 434 indicating the results of the compatibility check (i.e., the results of the execution of the finite state machines 414 and 424). For example, the compatibility data may include a Yes/No string value that indicates total end to end compatibility or not. As another example, the compatibility data 434 may include a percentage score indicating how closely compatible the process implemented by P is to the expectations of U. As another example, the compatibility data 434 may include a list of events of the process of the user 420 that are not supported/compatible with the BPaaS, e.g., events which were required but not sent.

Figure 4B:
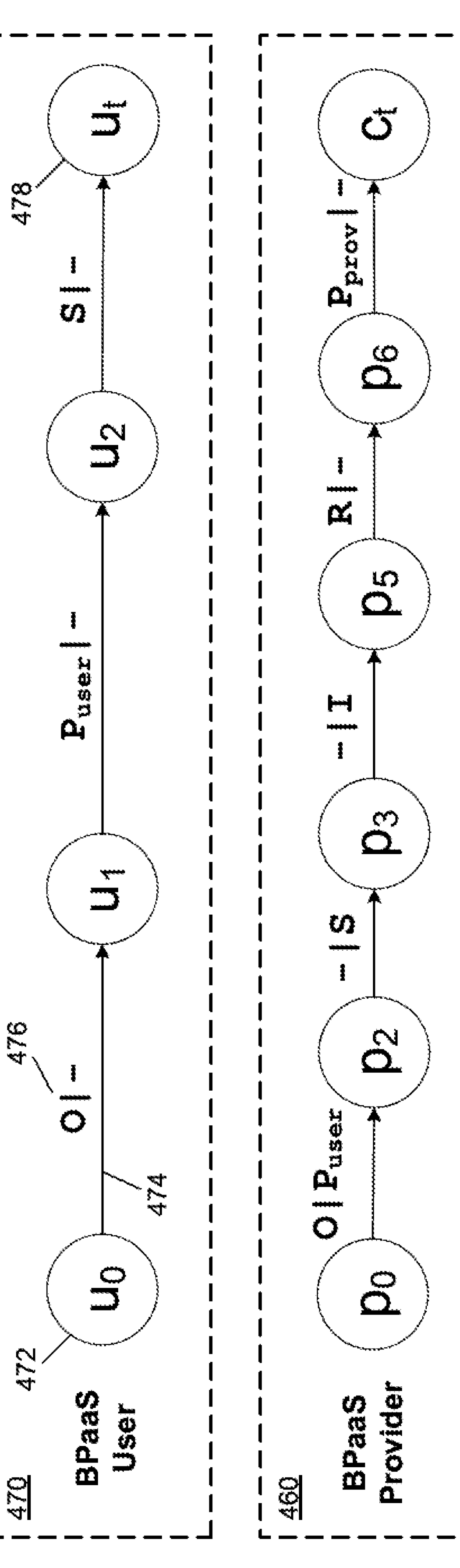
Figure 4B:
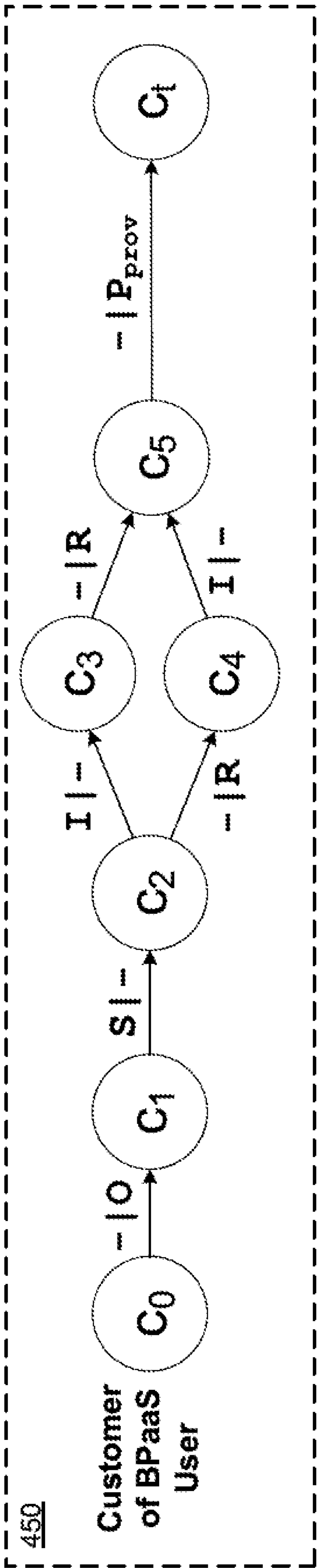

FIG. 4B illustrates a formal representation 440 of three automata 450, 460, and 470 created from the sequences of events of the BPMN model 300 shown in FIG. 3. Here, the automata 450, 460, and 470 may be embodied in a single finite state machine or multiple finite state machines that can be run together. A similar set of automata may be created for the process of the user which is also converted into one or more finite state machines. The finite state machines may then be executed together. In this example, the automata 470 represents a sequence of events expected or sent by the user process. In this case, the user is a company that seeks a BPaaS provider to host their business process. Each state of the user's process is embodied as node 472. The nodes 472 are connected by edges 474 with arrows indicating an order of the states. Furthermore, the edges 474 may be annotated with mealy automation 476 which must occur to change the state of the user. The mealy automation 476 may include an expected event and a reaction to the expected event. The states continue to change until a final state 478 is achieved.

The other automata 450 and 460 include similar nodes, edges, and annotations as the automata 470. In particular, automata 460 represents a sequence of events of the host process performed by the BPaaS hosted by the BPaaS provider and automata 450 represents a sequence of events of the user process for a customer of the user (e.g., a customer who is a purchaser of goods from a store, website, etc. of the user, etc.)

In the example embodiments, the finite state machines/automata are formal representation of who (provider P, user U, and customer C) will send what (which event) and when (logical order & under which preconditions). Compliance can then be checked formally for all sequences. The host may determine whether the BPaaS offered by P complies with each of the required sequences of the user U and any customers C of user U. The output result may indicate whether it is a match or which process paths are currently not supported by the provider in which case the provider P knows directly what would have to be changed to allow those paths as well, if it makes sense for the provider. The host platform may derive one automaton per participant which accepts sequences of events as required by the participant. Then the host may execute these automata in parallel, having them communicate via events in $\mathcal{E}^S$ and react to events in $\mathcal{E}^R$ which allows the host platform to formally verify that no deadlock/hanging up occurs and which of the all required/desired paths can be covered.

In some embodiments, the provider P can further restrict or empower process variants and, thus, the corresponding automata to increase the compliance. The process may be broken into the only signals which other partners can see/perceive/receive: events. In other words, local internal events may be not be added to the automata. When a process instance changes its state, the corresponding event can be sent to the involved parties. Having an exhaustive set of events defined (i.e., for all the states an ERP system can have a process instance or business documents such as Sales Orders participating therein in), compliance with the participants' required sequences can be verified formally. Further, iterations of the process model on either side (P, U or C) can be checked by the host platform automatically and rejected if they are incompatible. Furthermore, reasons for such incompatibility can be shown to the provider via a user interface or some other means to enable the provider to take steps to expand the scope of the BPaaS and offer it to a larger group/corpus of users.

Figure 5:
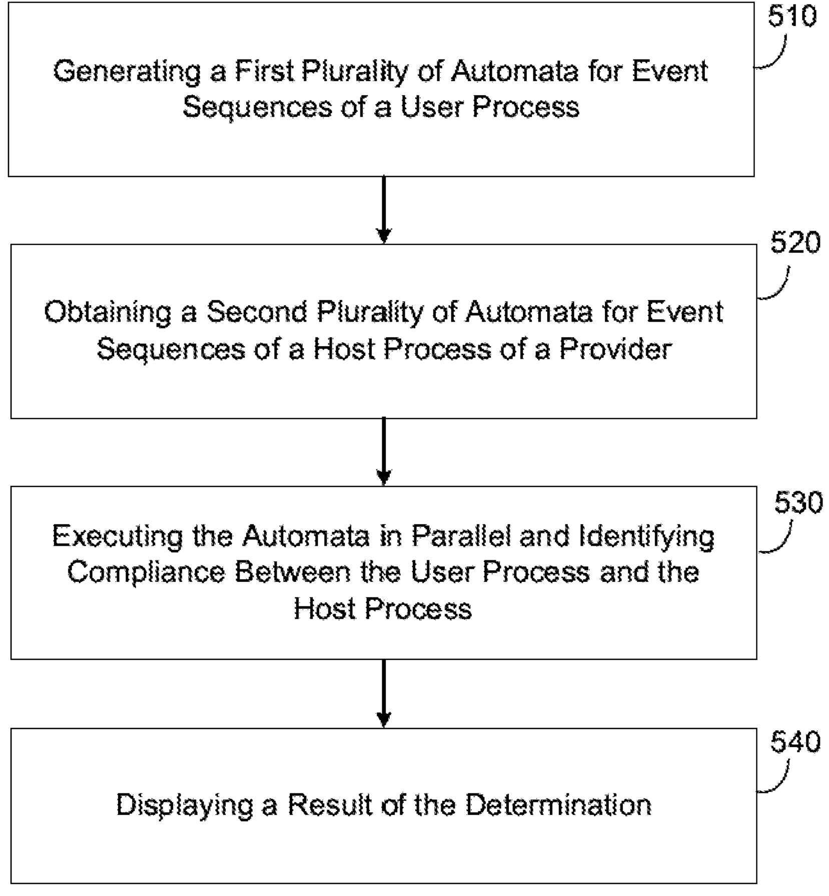
FIG. 5 is a diagram illustrating a method of executing a BPaaS compatibility check in accordance with an example embodiment.

FIG. 5 illustrates a method 500 of executing a BPaaS compatibility check in accordance with an example embodiment. As an example, the method 500 may be performed by a cloud platform, a web server, an on-premises server, a user device, a database, a combination of devices, and the like. Referring to FIG. 5, in 510, the method may include generating a first plurality of finite state automata corresponding to a plurality of event sequences in a software process of a user. In 520, the method may include obtaining, from storage, a second plurality of finite state automata based on a second plurality of event sequences in a host process of a provider. In 530, the method may include establishing channels of communication between the first and second plurality of finite state automata via a runtime environment, executing the first and second plurality of finite state automata in parallel via the established channels, and determining whether the user process is compatible with the host process of the provider based on results of the execution. In 540, the method may include displaying a result of the determination via a user interface of a computing system associated with the user.

In some embodiments, the generating the second plurality of finite state automata may include reading the second plurality of event sequences from a process instance of the host process as it executes and determining the second plurality of finite state automata based on read event sequences. In some embodiments, the obtaining of the second plurality of finite state automata may include extracting the second plurality of event sequences from a process graph of the software process of the user, and determining the second plurality of finite state automata based on the extracted second plurality of event sequences. In some embodiments, the first and second finite state automata comprise a first plurality of mealy automata for the software process of the user and a second plurality of mealy automata for the host process of the provider, and the method further includes executing the first and second pluralities of mealy automata in parallel.

In some embodiments, the determining may include detecting when a deadlock occurs between the first and second plurality of finite state automata, and determining whether expectations of the user with respect to the software process of the user are compatible with the host process of the provider based on the detected deadlock. In some embodiments, the determining may include checking a plurality of event sequences of the user process embodied in the first plurality of finite state automata against a corresponding plurality of event sequences of the host process embodied in the second plurality of finite state automata based on the results of the execution of the first and second pluralities of finite state automata.

In some embodiments, the determining may include detecting one or more events of the user process that create an error during the execution, and displaying identifiers of the one or more detected events via the user interface. In some embodiments, the method may further include receiving an updated second plurality of automata from the provider, and determining whether the first process is compatible with the host process via execution of the first plurality of automata and the updated second plurality of automata.

The BPaaS described herein is a turnkey solution that users can purchase or otherwise register with and hand over their process to the BPaaS provider. The BPaaS may be scaled up with relative ease by simply deploying more BPaaS's. In some embodiments, the system may also use a BPMN model of the BPaaS to determine various attributes of the BPaaS such as a process model. Furthermore, when changes are made to a BPaaS by its provided, the changes may be reflected in the BPMN. Thus, the host platform may identify when the BPMN has changed and update the corresponding finite state machine. Furthermore, the host platform may re-check the compatibility of the updated BPaaS with respect to the user's requirements (sequences of events) and determine whether the updated BPaaS is compatible with the user's process.

Figure 6:
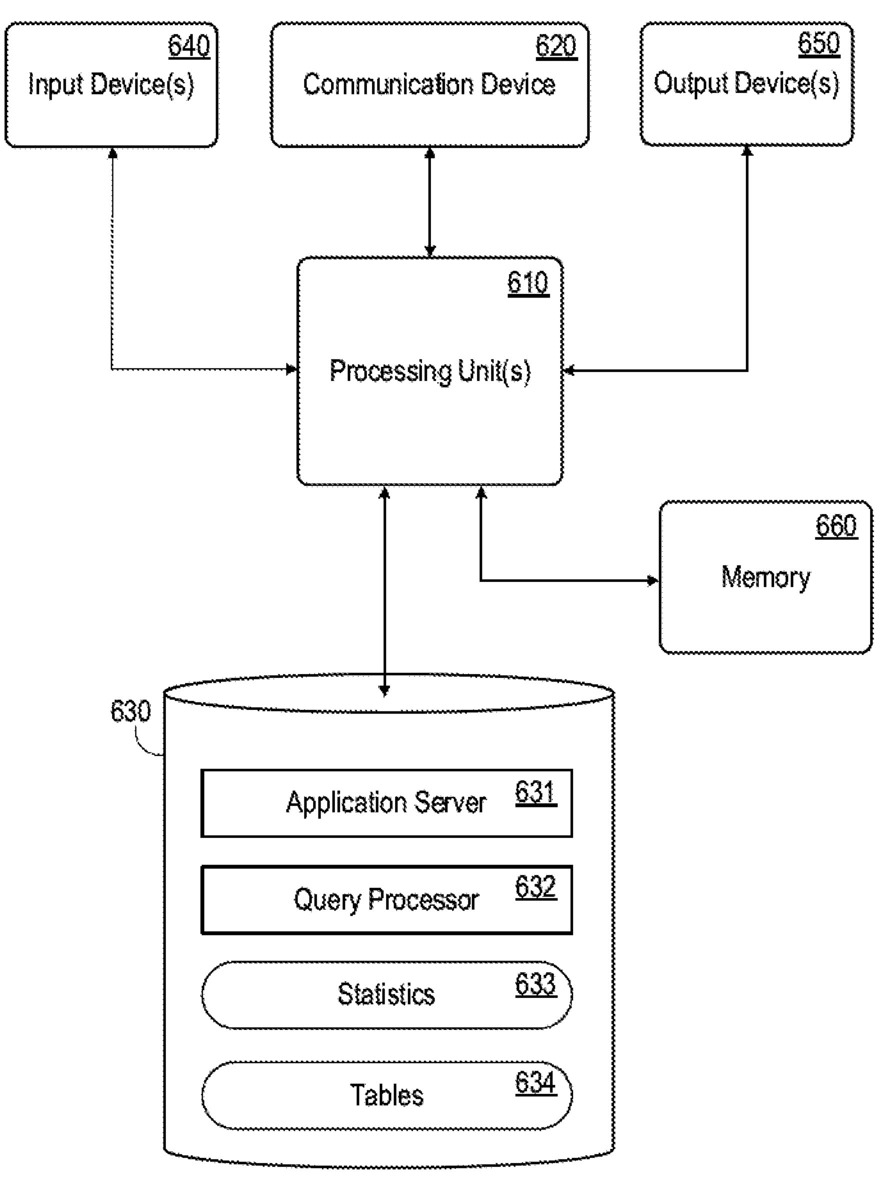
FIG. 6 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

FIG. 6 is a diagram of a server node 600 according to some embodiments. The server node 600 may include a general-purpose computing apparatus and may execute program code to perform any of the functions described herein. As one example, the server node 600 may be the host platform 120 shown and described in FIG. 1, the host platform 430 shown and described in FIG. 4A, and the like. The server node 600 may comprise an implementation of a remote terminal or a host platform, in some embodiments. It should also be appreciated that the server node 600 may include other unshown elements according to some embodiments and may not include all of the elements shown in FIG. 6. The server node 600 may perform the method 500 shown in FIG. 5.

Server node 600 includes processing unit(s) 610 (i.e., processors) operatively coupled to communication device 620, data storage device 630, input device(s) 640, output device(s) 650, and memory 660. Communication device 620 may facilitate communication with external devices, such as an external network or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into the server node 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM). In some embodiments, the data storage device 630 may store user interface elements in tabular form. For example, one or more columns and one or more rows of user interface elements may be displayed in a two-dimensional spreadsheet, table, document, digital structure, or the like.

Application server 631 and query processor 632 may each comprise program code executed by processing unit(s) 610 to cause server node 600 to perform any one or more of the processes described herein. Such processes may include estimating a selectivity of a query on tables 634 based on statistics 633. Embodiments are not limited to execution of these processes by a single computing device. Data storage device 630 may also store data and other program code for providing additional functionality and/or which are necessary for operation of server node 600, such as device drivers, operating system files, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:

a processor configured to generate a first plurality of finite state automata corresponding to a plurality of event sequences in a software process of a user, the first plurality of finite state automata comprising a first plurality of mealy automata;

obtain, from storage, a second plurality of finite state automata based on a second plurality of event sequences in a host process of a provider, the second plurality of finite state automata comprising a second plurality of mealy automata for the host process;

establish channels of communication between the first and second plurality of finite state automata via a runtime environment, execute the first and second plurality of finite state automata in parallel via the established channels, and determine whether the user process is compatible with the host process of the provider based on results of the execution, wherein the execution of the first and second plurality of finite state automata in parallel comprises executing the first and second pluralities of mealy automata in parallel; and display a result of the determination via a user interface of a computing system associated with the user.

2. The computing system of claim 1, wherein the processor is configured to read the second plurality of event sequences from a process instance of the host process as it executes and determine the second plurality of finite state automata based on read event sequences.

3. The computing system of claim 1, wherein the processor is configured to extract the second plurality of event sequences from a process graph of the software process of the user, and determine the second plurality of finite state automata based on the extracted second plurality of event sequences.

4. The computing system of claim 1, wherein the processor is further configured to detect when a deadlock occurs between the first and second plurality of finite state automata, and determine whether expectations of the user with respect to the software process of the user are compatible with host process of the provider based on the detected deadlock.

5. The computing system of claim 1, wherein the processor is configured to check a plurality of event sequences of the user process embodied in the first plurality of finite state automata against a corresponding plurality of event sequences of the host process embodied in the second plurality of finite state automata based on the results of the execution of the first and second pluralities of finite state automata.

6. The computing system of claim 1, wherein the processor is configured to detect one or more events of the user process that create an error during the execution, and display identifiers of the one or more detected events via the user interface.

7. The computing system of claim 1, wherein the processor is further configured to receive an updated second plurality of automata from the provider, and determine whether the first process is compatible with the host process via execution of the first plurality of automata and the updated second plurality of automata.

8. A method comprising:

generating a first plurality of finite state automata corresponding to a plurality of event sequences in a software process of a user, the first plurality of finite state automata comprising a first plurality of mealy automata;

obtaining, from storage, a second plurality of finite state automata based on a second plurality of event sequences in a host process of a provider, the second plurality of finite state automata comprising a second plurality of mealy automata for the host process;

establishing channels of communication between the first and second plurality of finite state automata via a runtime environment, executing the first and second plurality of finite state automata in parallel via the established channels, and determining whether the user process is compatible with the host process of the provider based on results of the execution, wherein the execution of the first and second plurality of finite state automata in parallel comprises executing the first and second pluralities of mealy automata in parallel; and displaying a result of the determination via a user interface of a computing system associated with the user.

9. The method of claim 8, wherein the generating the second plurality of finite state automata comprises reading the second plurality of event sequences from a process instance of the host process as it executes and determining the second plurality of finite state automata based on read event sequences.

10. The method of claim 8, wherein the generating the second plurality of finite state automata comprises extracting the second plurality of event sequences from a process graph of the software process of the user, and determining the second plurality of finite state automata based on the extracted second plurality of event sequences.

11. The method of claim 8, wherein the determining comprises detecting when a deadlock occurs between the first and second plurality of finite state automata, and determining whether expectations of the user with respect to the software process of the user are compatible with the host process of the provider based on the detected deadlock.

12. The method of claim 8, wherein the determining comprises checking a plurality of event sequences of the user process embodied in the first plurality of finite state automata against a corresponding plurality of event sequences of the host process embodied in the second plurality of finite state automata based on the results of the execution of the first and second pluralities of finite state automata.

13. The method of claim 8, wherein the determining comprises detecting one or more events of the user process that create an error during the execution, and displaying identifiers of the one or more detected events via the user interface.

14. The method of claim 8, wherein the method further comprises receiving an updated second plurality of automata from the provider, and determining whether the first process is compatible with the host process via execution of the first plurality of automata and the updated second plurality of automata.

15. A non-transitory computer-readable medium comprising instructions which when executed by a processor cause a computer to perform a method comprising:

generating a first plurality of finite state automata corresponding to a plurality of event sequences in a software process of a user, the first plurality of finite state automata comprising a first plurality of mealy automata;

obtaining a second plurality of finite state automata based on a second plurality of event sequences in a host process from a storage, the second plurality of finite state automata comprising a second plurality of mealy automata for the host process;

establishing channels of communication between the first and second plurality of finite state automata via a runtime environment, executing the first and second plurality of finite state automata in parallel via the established channels, and determining whether the user process is compatible with the host process based on results of the execution, wherein the execution of the first and second plurality of finite state automata in parallel comprises executing the first and second pluralities of mealy automata in parallel; and displaying a result of the determination via a user interface of a computing system associated with the user.

16. The non-transitory computer-readable medium of claim 15, wherein the generating the second plurality of finite state automata comprises reading the second plurality of event sequences from a process instance of the host process as it executes and determining the second plurality of finite state automata based on read event sequences.

17. The non-transitory computer-readable medium of claim 15, wherein the generating the second plurality of finite state automata comprises extracting the second plurality of event sequences from a process graph of the software process of the user, and determining the second plurality of finite state automata based on the extracted second plurality of event sequences.

18. The non-transitory computer-readable medium of claim 15, wherein the determining comprises checking a plurality of event sequences of the user process embodied in the first plurality of finite state automata against a corresponding plurality of event sequences of the host process embodied in the second plurality of finite state automata based on the results of the execution of the first and second pluralities of finite state automata.

* * * * *